(12) United States Patent
Kim et al.

(10) Patent No.: US 10,959,228 B2
(45) Date of Patent: Mar. 23, 2021

(54) METHOD FOR TRANSMITTING CARRIER COMBINATION FOR CARRIER AGGREGATION AND ELECTRONIC DEVICE THEREFOR

(71) Applicant: Samsung Electronics Co., Ltd., Gyeonggi-do (KR)

(72) Inventors: Kwanghee Kim, Gyeonggi-do (KR); Jiyeon Lee, Gyeonggi-do (KR); Sunggi Baek, Gyeonggi-do (KR); Jongphil Lee, Gyeonggi-do (KR); Gwangho Lee, Gyeonggi-do (KR); Changhun Lee, Gyeonggi-do (KR); Janghoon Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/296,542

(22) Filed: Mar. 8, 2019

(65) Prior Publication Data
US 2019/0281604 A1   Sep. 12, 2019

(30) Foreign Application Priority Data
Mar. 8, 2018   (KR) .................. 10-2018-0027648

(51) Int. Cl.
H04W 72/04   (2009.01)
H04W 72/12   (2009.01)
H04W 84/04   (2009.01)

(52) U.S. Cl.
CPC ....... *H04W 72/0453* (2013.01); *H04W 72/12* (2013.01); *H04W 84/042* (2013.01)

(58) Field of Classification Search
CPC .............................................. H04W 72/0453
See application file for complete search history.

(56) References Cited

U.S. PATENT DOCUMENTS 9,226,136 B2 * 12/2015 Kim ....................... H04W 8/24
9,655,121 B2   5/2017 Kim et al.
(Continued)

FOREIGN PATENT DOCUMENTS

JP   2016-197851 A   11/2016
KR   10-2015-0128508 A   11/2015
(Continued)

OTHER PUBLICATIONS

3GPP TS 36.331 V14.5.1 (Jan. 2018); 3rd Generation Partnership Project; Technical Specification Group Radio Access Network; Evolved Universal Terrestrial Radio Access (E-UTRA); Radio Resource Control ( RRC); Protocol specificaiton (Release 14).

*Primary Examiner* — Andrew Lai
*Assistant Examiner* — Andrew C Lee
(74) *Attorney, Agent, or Firm* — Cha & Reiter, LLC

(57) ABSTRACT

An electronic device including a communication circuitry, a processor, and a memory is provided. The processor of the electronic device receives a user equipment (UE) capability enquiry that includes information indicating the number of carrier aggregation (CA) combinations associated with a network from the network using the communication circuitry and determines UE capability information based on at least one of the number of default CA combinations of the electronic device, the number of CA combinations of a region associated with the network, the number of CA combinations of a country associated with the network, the number of CA combinations corresponding to a supported frequency band of a mobile network operator (MNO) associated with the network, and the number of CA combinations associated with the network.

13 Claims, 7 Drawing Sheets

(56) References Cited

U.S. PATENT DOCUMENTS

| | | | |
|---|---|---|---|
| 9,918,320 B2 | 3/2018 | Bae et al. | |
| 10,477,560 B1* | 11/2019 | Dong | H04L 5/0032 |
| 10,616,822 B2* | 4/2020 | Kubota | H04W 48/14 |
| 2009/0086672 A1* | 4/2009 | Gholmieh | H04W 48/14 |
| | | | 370/329 |
| 2013/0155868 A1* | 6/2013 | Seo | H03M 13/6525 |
| | | | 370/241 |
| 2015/0264637 A1 | 9/2015 | Zaus et al. | |
| 2015/0327269 A1* | 11/2015 | Kim | H04W 74/004 |
| | | | 370/329 |
| 2016/0183156 A1* | 6/2016 | Chin | H04L 61/2007 |
| | | | 370/331 |
| 2016/0227541 A1* | 8/2016 | Damnjanovic | H04L 5/001 |
| 2016/0249364 A1* | 8/2016 | Siomina | H04W 16/32 |
| 2017/0006621 A1* | 1/2017 | Jung | H04W 72/1215 |
| 2017/0223708 A1* | 8/2017 | Jung | H04W 76/14 |
| 2017/0251478 A1 | 8/2017 | Kim et al. | |
| 2017/0367073 A1* | 12/2017 | Murugan | H04B 1/0053 |
| 2018/0019898 A1* | 1/2018 | Takahashi | H04W 72/048 |
| 2018/0049213 A1* | 2/2018 | Gholmieh | H04W 72/1215 |
| 2018/0049262 A1* | 2/2018 | Jung | H04W 8/24 |
| 2018/0062855 A1* | 3/2018 | Bracken | H04L 9/30 |
| 2018/0070250 A1* | 3/2018 | Venkataraman | H04W 72/1284 |
| 2018/0070295 A1* | 3/2018 | Henry | H04W 36/00835 |
| 2018/0167904 A1* | 6/2018 | Lee | H04W 56/0045 |
| 2018/0199181 A1* | 7/2018 | Jung | H04W 72/02 |
| 2018/0242229 A1* | 8/2018 | Ahluwalia | H04W 8/06 |
| 2018/0263019 A1* | 9/2018 | Jung | H04W 72/04 |
| 2019/0199676 A1* | 6/2019 | Ku | H04M 7/0075 |
| 2019/0200386 A1* | 6/2019 | Yang | H04W 74/08 |

FOREIGN PATENT DOCUMENTS

| | | |
|---|---|---|
| KR | 10-2016-0108481 A | 9/2016 |
| KR | 10-2017-0068965 A | 6/2017 |

* cited by examiner

METHOD FOR TRANSMITTING CARRIER COMBINATION FOR CARRIER AGGREGATION AND ELECTRONIC DEVICE THEREFOR

CROSS-REFERENCE TO RELATED APPLICATION(S)

This application is based on and claims priority under 35 U.S.C. § 119 to Korean Patent Application No. 10-2018-0027648, filed on Mar. 8, 2018, in the Korean Intellectual Property Office, the disclosure of which is incorporated by reference herein its entirety.

BACKGROUND

1. Field

Embodiments of the present disclosure generally relate to a method for transmitting carrier combinations for carrier aggregation (CA) and an electronic device therefor.

2. Description of Related Art

With the introduction of the long term evolution-advanced (LTE-A) specification, use of carrier aggregation (CA) technology has become widespread. For example, user equipment (UE) may communicate with a base station (e.g., eNodeB (eNB)) using at least one component carrier (CC). By using the CA technology, the data rate for the UE may be increased and the base station may have increased scheduling flexibility. For example, each CC may have a bandwidth of 1.4, 3.5, 10, 15, or 20 MHz. The base station may allocate a specific CC to the UE based on the capability of the UE. The base station may perform uplink or downlink scheduling of the UE by allocating the specific CC.

The UE and/or the base station may support various standard specifications depending on their hardware and/or software. For example, the $3^{rd}$ generation partnership project (3GPP) technical specification may include different release versions each supporting different levels of CA. Thus, different UEs may support different levels of CA.

To perform CA-based scheduling for a UE, the base station may obtain and manage information about the level of CA supportable by the UE. For example, the base station may receive CA-related capability information from the UE and may manage the received capability information.

In general, because the base station manages a plurality of UEs, to manage UE capability information of the plurality of UEs, the base station may need significant storage space. Furthermore, when UE capability information is transmitted from the plurality of UEs, the throughput of the network for payloads and content may be reduced due to the transmission of the UE capability information. That is, the transmission of the UE capability information may increase overhead of the network.

The above information is presented as background information only to assist with an understanding of the present disclosure. No determination has been made, and no assertion is made, as to whether any of the above might be applicable as prior art with regard to the present disclosure.

SUMMARY

In accordance with an aspect of the present disclosure, an electronic device is provided. An electronic device may include a communication circuitry, a processor configured to be operatively connected to the communication circuitry, and a memory configured to be operatively connected to the processor. The memory may store instructions that, when executed, cause the processor to receive a user equipment (UE) capability enquiry that includes information indicating the number of carrier aggregation (CA) combinations associated with a network from the network using the communication circuitry, determine UE capability information based on at least one of the number of default CA combinations of the electronic device, the number of CA combinations of a region associated with the network, the number of CA combinations of a country associated with the network, the number of CA combinations corresponding to a supported frequency band of a mobile network operator (MNO) associated with the network, and the number of CA combinations associated with the network, and transmit the determined UE capability information to the network using the communication circuitry.

In accordance with another aspect of the present disclosure, a method for transmitting UE capability information in an electronic device is provided. A method may include receiving a UE capability enquiry that includes information indicating the number of CA combinations associated with a network from the network using a communication circuitry of the electronic device, determining UE capability information based on at least one of the number of default CA combinations of the electronic device, the number of CA combinations of a region associated with the network, the number of CA combinations of a country associated with the network, the number of CA combinations corresponding to a supported frequency band of an MNO associated with the network, and the number of CA combinations associated with the network, and transmitting the determined UE capability information to the network using the communication circuitry.

In accordance with another aspect of the present disclosure, an electronic device is provided. An electronic device may include a communication circuitry, a processor configured to be operatively connected to the communication circuitry, and a memory configured to be operatively connected to the processor. The memory stores instructions that, when executed, cause the processor to perform cell reselection, scan a frequency band for the reselected cell using the communication circuitry, receive system information including a public land mobile network identity (PLMN ID) from the reselected cell based on the scanning using the communication circuitry, and set CA combinations corresponding to a mobile network code (MNC) included in the PLMN ID as UE capability information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, certain embodiments of the present disclosure may be described with reference to accompanying drawings. Accordingly, those of ordinary skill in the art will recognize that modification, equivalent, and/or alternative on the embodiments described herein can be variously made without departing from the scope and spirit of the present disclosure.

Figure 1:
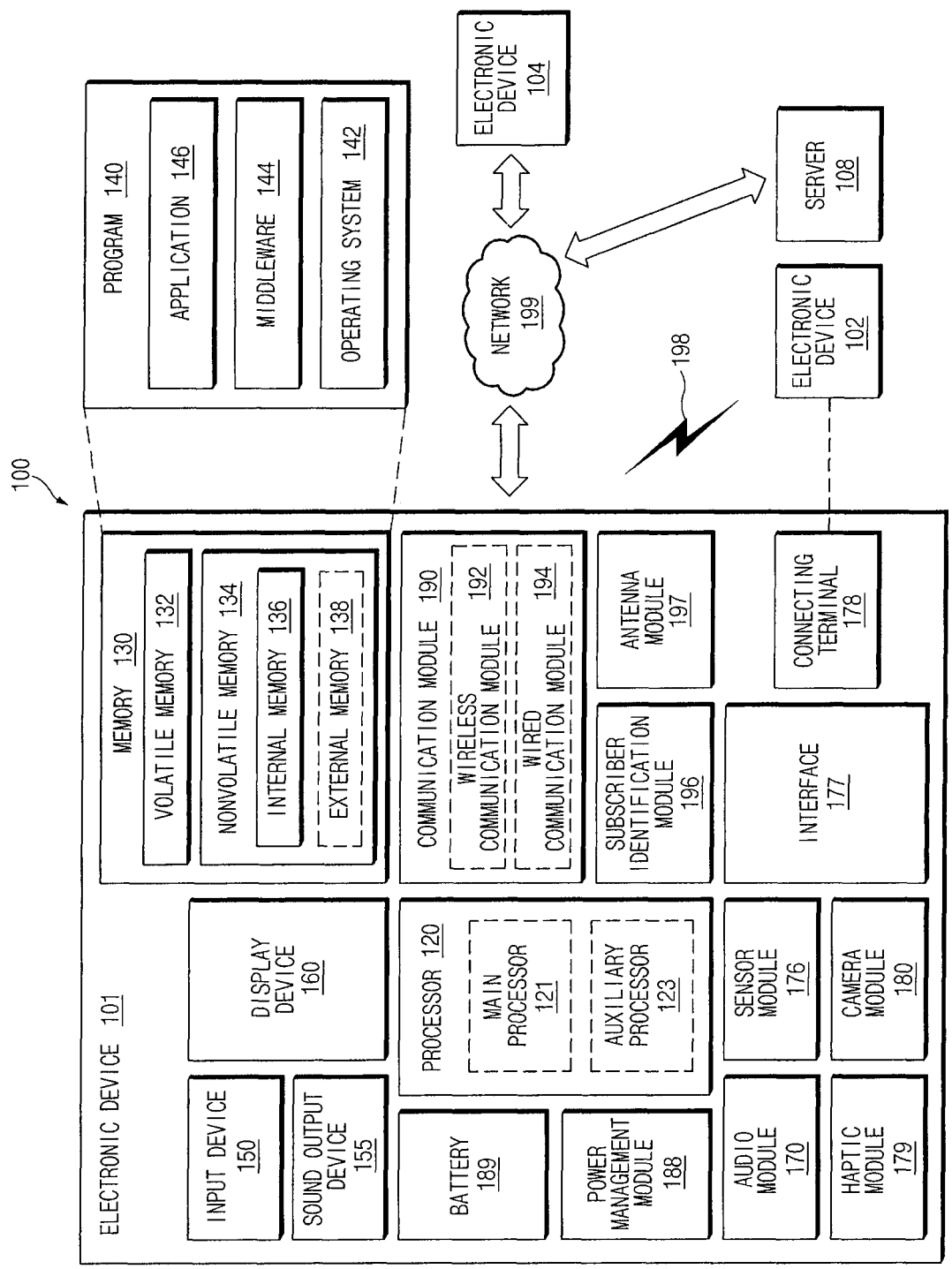
FIG. 1 is a block diagram illustrating an electronic device in a network environment according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
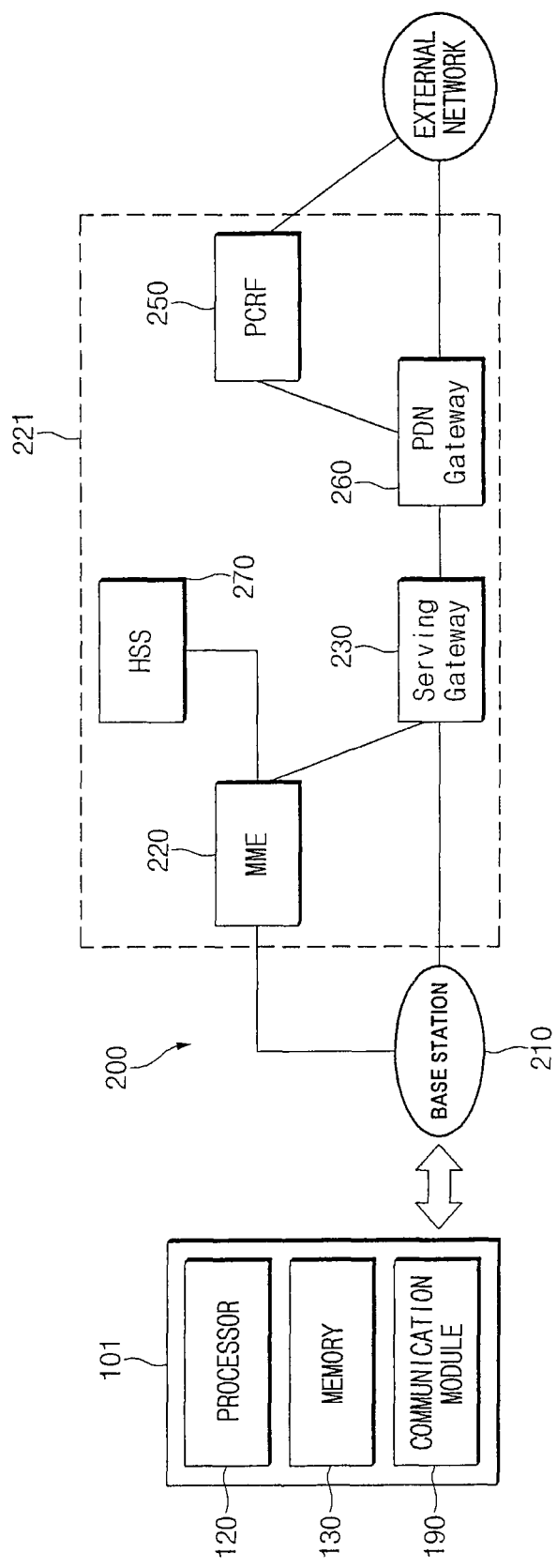
FIG. 2 is a block diagram illustrating configurations of an electronic device and a network according to an embodiment.

FIG. 2 is a block diagram illustrating configurations of an electronic device and a network according to an embodiment.

According to an embodiment, an electronic device 101 (e.g., an electronic device 101 of FIG. 1) may be a device configured to communicate with the network 200 using a specified communication specification. For example, the electronic device 101 may be a device (e.g., a phone with a foldable display or a smartphone) capable of telephonic communication and may include a device (e.g., a modem) for data communication. According to an embodiment, the electronic device 101 may include a processor (e.g., a processor 120 of FIG. 1), a memory (e.g., a memory 130 of FIG. 1), and a communication module (e.g., a communication module 190 of FIG. 1). According to an embodiment, the electronic device 101 may further include other components which are not shown in FIG. 2. For example, the electronic device 101 may include a device (e.g., an audio module 170 of FIG. 1) for receiving and outputting voice or speech, a display (e.g., a display device 160 of FIG. 1), and/or a proximity sensor (e.g., a sensor module 176 of FIG. 1). According to an embodiment, the electronic device 101 may include a module implementing an identifier (e.g., an international mobile subscriber identity (IMSI)) for identifying and/or authenticating the electronic device 101. For example, the electronic device 101 may include a universal subscriber identify module (USIM), an embedded SIM (eSIM), a universal integrated circuit card (UICC), or an embedded UICC (eUICC), to identify the electronic device 101.

According to an embodiment, the processor 120 may be operatively or electrically coupled with the memory 130 or the communication module 190 and may control operations of the memory 130, the communication module 190, and the electronic device 101. According to an embodiment, the processor 120 may include an application processor (e.g., a main processor 121 of FIG. 1) and/or a cellular processor (e.g., an auxiliary processor 123 of FIG. 1).

According to an embodiment, the memory 130 my store at least one instruction which causes the processor 120 to perform various operations. Operations of the electronic device 101, described below, may be referred to as operations of the processor 120. For example, operations of the electronic device 101 may be referred to as operations performed according to the instructions stored in the memory 130.

According to an embodiment, the communication module 190 may be configured to perform communication functions with the network 200. For example, the communication module 190 may be configured to transmit and receive a wireless signal. According to an embodiment, the communication module 190 may include at least one communication circuitry. For example, the communication circuitry may be referred to as a transceiver.

According to an embodiment, the network 200 may be configured to communicate with various devices including the electronic device 101. According to an embodiment, the network 200 may be a cellular network. According to an embodiment, the network 200 may include an evolved packet core (EPC) 221 connected to a network outside a base station 210. According to an embodiment, the EPC 221 may include a mobility management entity (MME) 220, a serving-gateway (S-GW) 230, a packet data network (PDN)-gateway (P-GW) 260, a policy charging and rules function (PCRF) 250, and a home subscriber server (HSS) 270. According to an embodiment, the EPC 221 may further include components not shown in FIG. 2. The electronic device 201 may access an external network through the base station 210 and the EPC 221.

According to an embodiment, the base station 210 may provide a wireless connection to the electronic device 101. The base station 210 may be a radio access network (RAN) node and may correspond to (1) a radio network controller (RNC) of the universal terrestrial radio access network (UTRAN) system and (2) a base station controller (BSC) of the global system for mobile communications (GSM) enhanced data rates for GSM evolution (EDGE) radio access network (GERAN). The base station 210 may be connected with the electronic device 101 over a radio channel and may be deployed in a similar role as existing RNCs/BSCs. According to an embodiment, the base station 210 may simultaneously support several cells. In this embodiment, the base station 210 may support at least one component carrier (CC) for each cell. In embodiments below, the base station 210 may be referred to as an eNodeB (eNB).

Referring to FIG. 2, according to an embodiment, the MME 220 may be a node for controlling the control plane of the EPC 221 and may perform various functions such as the connection and release of the radio bearer. In FIG. 2, the MME 220 may be connected with the single base station 210, but although not illustrated, the MME 220 may be connected with a plurality of base stations. The S-GW 230 may be a node for controlling the user plane for LTE RAN in the EPC 221 and may operate as a mobility anchor for the electronic device 101. Furthermore, the S-GW 230 may be a device for providing a data bearer and may generate or remove the data bearer a under control of the MME 220. The P-GW 260 may be a node for connecting an external network (e.g., the Internet) with the EPC 221 and may allocate an internet protocol (IP) address to the electronic device 101. Further, the P-GW 260 may apply a quality of service (QoS) (e.g., priority and/or bandwidth) according to the PCRF 250. For example, the P-GW 260 may manage uplink/downlink traffic for a UE (e.g., the electronic device 101) and/or access time for the UE. The HSS 270 may be a node having subscriber information. According to an embodiment, the PCRF 250 may be a device for controlling policy rules and charging associated with the QoS of a user. The PCRF 250 may deliver policy and charging control (PCC) rules to the P-GW 260.

Figure 3:
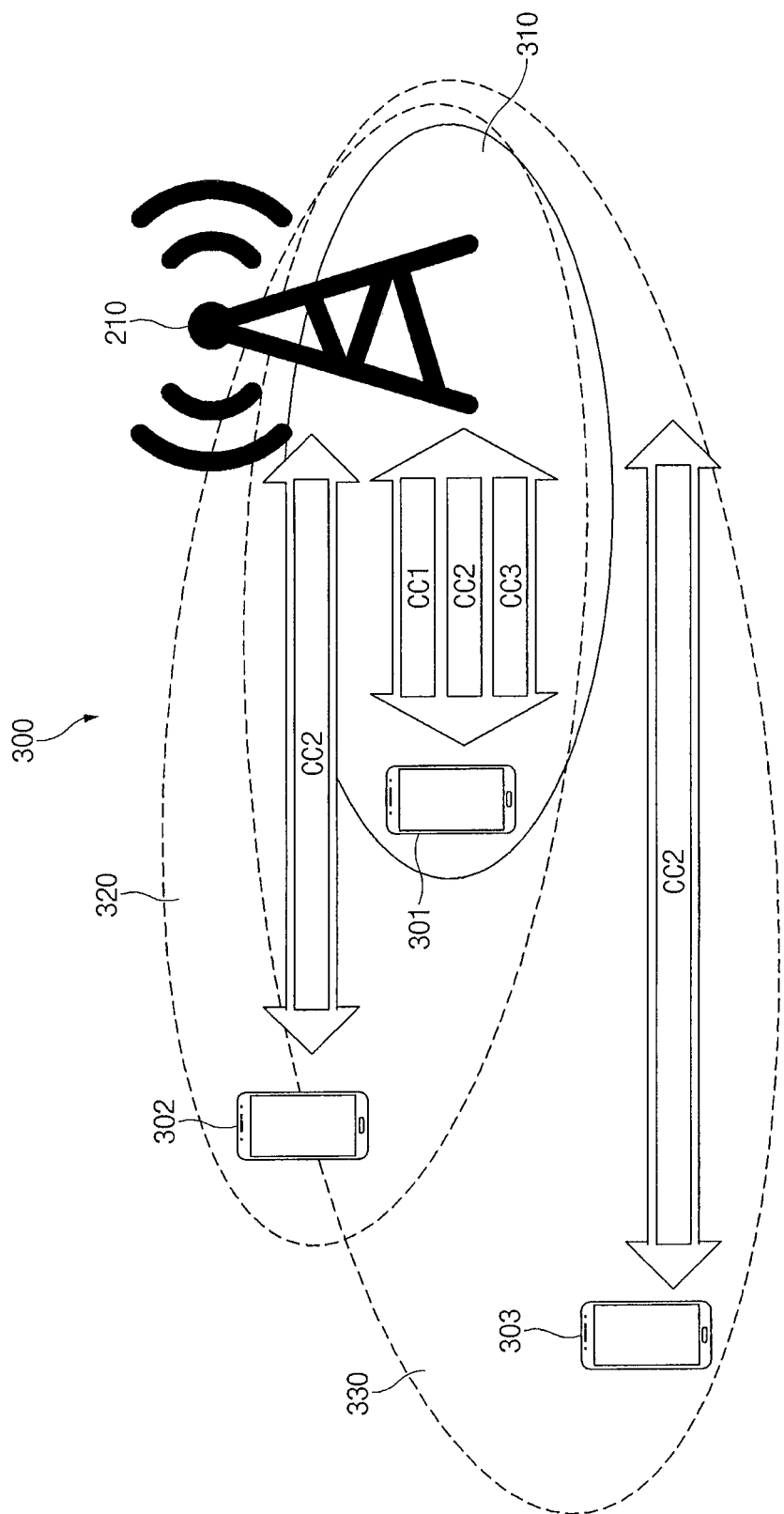
FIG. 3 is a schematic diagram illustrating a carrier aggregation (CA) method according to an embodiment.

FIG. 3 is a schematic diagram 300 illustrating a carrier aggregation (CA) method according to an embodiment.

According to an embodiment, a base station (e.g., the base station 210 of FIG. 2) may provide wireless communication to a UE (e.g., the first electronic device 301, the second electronic device 302, and the third electronic device 303) on a plurality of cells. According to an embodiment, the base station 210 may provide wireless communication via a first cell 310, a second cell 320, and a third cell 330. For example, the first electronic device 301 may be located on the first cell 310, the second electronic device 302 may be located on the second cell 320, and the third electronic device 303 may be located on the third cell 330. Each of the first electronic device 301, the second electronic device 302, and the third electronic device 303 may be an electronic device having a configuration which is substantially the same as an electronic device 101 of FIG. 1 or 2.

According to an embodiment, the base station 210 may perform uplink and/or downlink scheduling for each UE (e.g., the electronic device 101 of FIG. 1 or 2, the first electronic device 301, the second electronic device 302, and the third electronic device 303). For example, scheduling of the base station 210 may include allocation of a radio resource (e.g., a component carrier (CC)) to be used by each UE. The 3GPP Release 10 may support CA technology capable of allocating a plurality of CCs to one UE. For example, the base station 210 may be a base station which supports the 3GPP Release 10 or above. According to an embodiment, CC1, CC2, and CC3 may correspond to different frequency bands. For example, CC1, CC2, and CC3 may be consecutive or non-consecutive bands on a frequency spectrum.

According to an embodiment, the first electronic device 301 may communicate with the first cell 310 using CC1, CC2, and CC3. The second electronic device 302 may communicate with the second cell 320 using CC2. The third electronic device 303 may communicate with the third cell 330 using CC3. Thus, the base station 210 may allocate three CCs to the first electronic device 301 based on the CA technology.

Referring to FIG. 3, according to an embodiment, three CCs may be allocated to the first electronic device 301. In FIG. 3, the same CCs are allocated to uplink and downlink. However, embodiments of the present disclosure are not limited thereto. For example, some of the CCs may be allocated to only the uplink and the remaining CCs may be allocated to the downlink.

According to an embodiment, the first electronic device 301 may communicate with the first cell 310 using one primary component carrier (PCC) and two secondary component carriers (SCCs). For example, CC1 may be the PCC, and CC2 and CC3 may be the SCCs. According to an embodiment, the PCC may be used to transmit and receive control information and data, and the SCC may be used to transmit and receive data. For example, the base station 210 may transmit control information about CC2 and/or CC3 to the first electronic device 301 using CC1.

According to an embodiment, CC combinations (e.g., frequency band combinations) available for CA by the base station 210 and the UE (e.g., the electronic device 101 of FIG. 2) may vary with different 3GPP Releases. In embodiments below, the CC combinations available for CA by the base station 210 and the UE may be called CA combinations. According to an embodiment, the base station 210 and/or the UE, when supporting 3GPP Release 10, may support a maximum of 128 CA combinations. The base station 210 and/or the UE, when supporting 3GPP Release 11 or 12, may support a maximum of 256 CA combinations. The base station 210 and/or the UE, when supporting 3GPP Release 13, may support a maximum of 384 CA combinations.

According to an embodiment, the first electronic device 301 may be the UE (e.g., the electronic device 101 of FIG. 2) capable of supporting the 3GPP Release 11, the second electronic device 302 may be the UE capable of supporting the 3GPP Release 10, and the base station 210 may support the 3GPP Release 13. Because different 3GPP specifications are supported by different UEs, the base station 210 may need information about the CA combinations supported by each UE in order to allocate CCs according to CA.

According to an embodiment, the number of CA combinations supportable by the UE (e.g., the electronic device 101 of FIG. 1) may vary with functionalities of the UE. For example, the first electronic device 301 may support full duplex communication, but the third electronic device 303 may support only half duplex communication. In this case, although the first electronic device 301 and the third electronic device 303 may support the same 3GPP specification, the number of CA combinations supported by the first electronic device 301 may differ from the number of CA combinations supported by the third electronic device 303.

According to an embodiment, the number of CA combinations available to the UE (e.g., the electronic device 101 of FIG. 2) as determined by the base station 210 may be less than the number of CA combinations supported by the base station 210. According to an embodiment, the number of supported CA combinations may vary by region and/or country. For example, the number of CA combinations supported by each region and/or country may be limited due to legal and/or policy reasons. According to an embodiment, the number of CA combinations supported by each UE may vary depending on the mobile network operators (MNOs). For example, when different MNOs support different frequency bands, there may be a difference in the number of CA combinations supported by each MNO.

As shown in FIG. 3, the base station 210 may increase the amount of data transmission using CA technology and may increase flexibility in uplink/downlink scheduling. As described above, because CA combinations may vary with the base station 210 and the UE (e.g., the electronic device 101 of FIG. 2), the base station 210 may receive information about CA combinations of the UE from the UE in order to perform CA scheduling.

Figure 4:
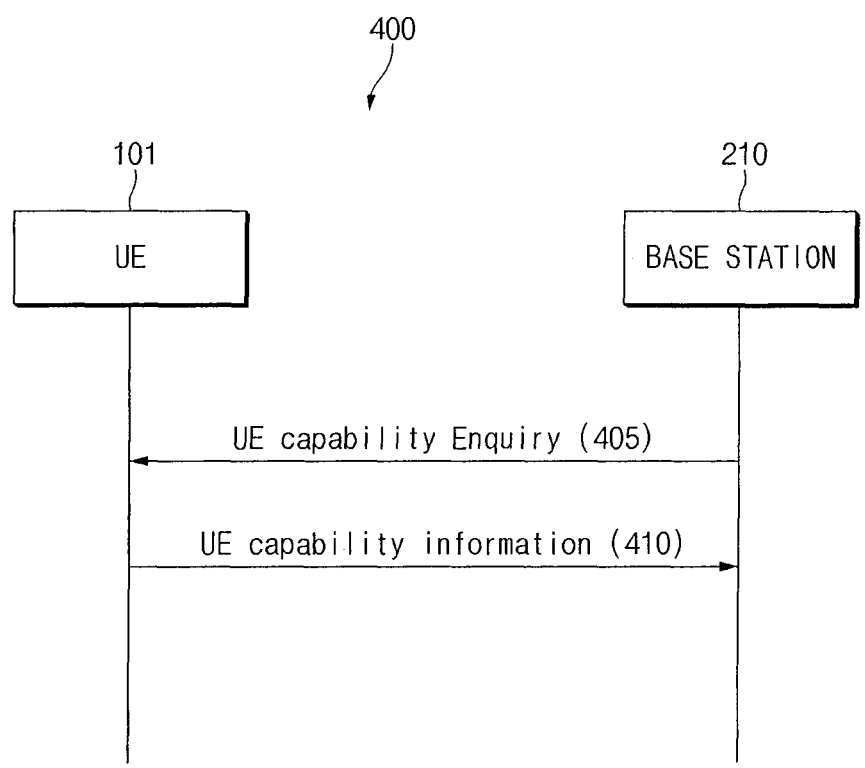
FIG. 4 is a signal sequence diagram illustrating a message exchange operation for transmitting UE capability information between an electronic device and a base station according to an embodiment.

FIG. 4 is a signal sequence diagram illustrating a message exchange operation 400 for transmitting UE capability information between an electronic device and a base station according to an embodiment.

The message exchange operation 400 described below may be performed to transmit, for example, radio access capability information of a UE (e.g., an electronic device 101 of FIG. 2). For example, the message exchange operation 400 may be performed when the UE 101 establishes a radio resource control (RRC) connection. The message exchange operation 400 may be initiated by a request sent to the UE 101.

According to an embodiment, a base station (e.g., the base station 210 of FIG. 2) may request the UE 101 to transmit information about CA combinations supported by the UE 101. For example, referring to operation 405, the base station 210 may transmit a UE capability enquiry message to the UE 101. According to an embodiment, the base station 210 may transmit the UE capability enquiry message using higher layer signaling (e.g., RRC signaling). For example, the base station 210 may transmit the UE capability enquiry message to the UE 101 over a downlink-dedicated control channel (DL-DCCH).

According to an embodiment, the UE capability enquiry message may include information about requested CA combinations (e.g. CA combinations requested to be transmitted from the UE 101) and/or information about CA combinations supported by a network (e.g., the network 200 of FIG. 2). According to an embodiment, the UE capability enquiry message may include information about requested frequency bands (e.g., requestedFrequencyBands). For example, the information about the requested frequency band may include information about at least one frequency band, such as a list of frequency bands, associated with CA combinations requested to be transmitted from the UE 101. According to an embodiment, the UE capability enquiry message may include requested maximum downlink CC information (e.g., requestedMaxCCsDL). For example, the requested maximum downlink CC information may indicate the maximum number of downlink CCs associated with the CA combinations requested to be transmitted from the UE 101. According to an embodiment, the UE capability enquiry message may include requested maximum uplink CC information (e.g., requestedMaxCCsUL). For example, the requested maximum uplink CC information may indicate the maximum number of uplink CCs associated with the CA combinations requested to be transmitted from the UE 101.

According to an embodiment, the UE 101 may transmit CA combination information including supported frequency band combinations (e.g., CC) to the base station 210. For example, referring to operation 410, the UE 101 may transmit a UE capability information message to the base station 210. According to an embodiment, the UE 101 may transmit the UE capability information message using higher layer signaling (e.g., RRC signaling). For example, the UE 101 may transmit the UE capability information message over an uplink-dedicated control channel (UL-DCCH).

According to an embodiment, the UE capability information message may include information about CA combinations supported by the UE 101. For example, the UE capability information message may include information about the number of maximum CA combinations supported by the UE 101. As another example, the UE capability information message may include information about each CA combination supported by the UE 101 (e.g., information about a plurality of frequency bands (e.g., CCs) included in each CA combination).

According to an embodiment, the 3GG specification supported by the UE 101 may differ from the 3GG specification supported by the base station 210. For example, the UE 101 may support 256 CA combinations according to the 3GPP Release 11, and the base station 210 may support 128 CA combinations according to the 3GPP Release 10. In this case, according to an embodiment, the base station 210 may set information about CA combinations included in the UE capability enquiry message or information about CA combinations supported by the network 200 to 128 and may transmit the set information to the UE 101. The UE 101 may transmit a UE capability information message including only 128 CA combinations to the base station 210 based on the UE capability enquiry message received from the base station 210. In this case, information regarding the remaining 128 CA combinations supported by the UE 101 may not be transmitted to the base station 210.

According to an embodiment, the UE capability information message transmitted by the UE 101 may be managed by an MME (e.g., an MME 220 of FIG. 2). A plurality of UEs may be associated with the base station 210, and a plurality of base stations may be associated with the one MME 220. Thus, the amount of the UE capability information messages managed by the MME 220 may be significant when there is a large number of UEs and base stations.

According to an embodiment, when there is a large number of UE capability information messages, a relatively long time may be required to transmit these UE capability information messages. For example, due to continuous transmission of the UE capability information messages, acknowledgements (ACK) from the base station 210 to the UE 101 may be omitted. Due to the omission of the ACK, the connection between the UE 101 and the base station 210 may be released.

Figure 5:
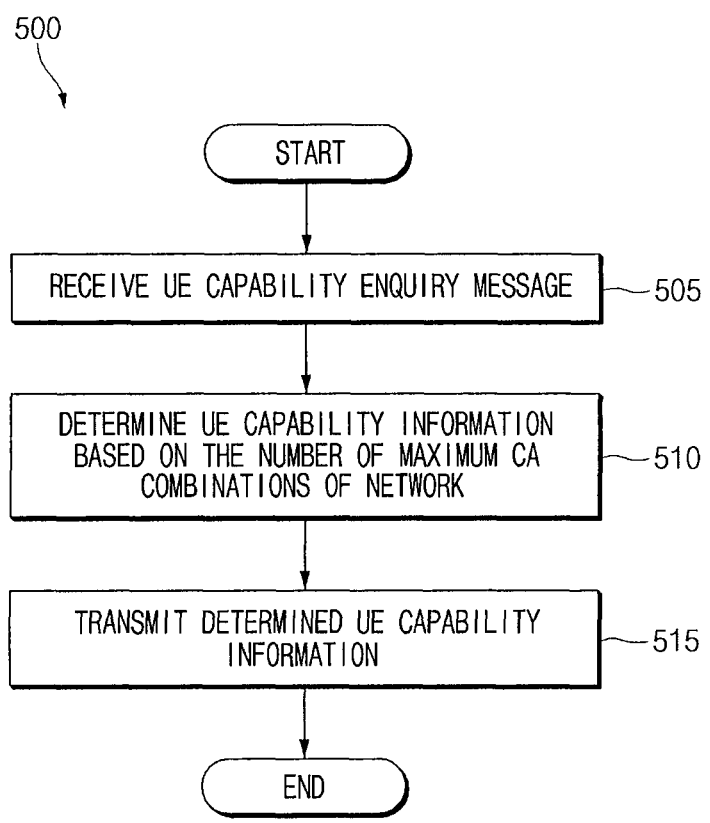
FIG. 5 is a flowchart illustrating a method for transmitting UE capability information in an electronic device according to an embodiment.

FIG. 5 is a flowchart illustrating a method 500 for transmitting UE capability information in an electronic device according to an embodiment.

According to an embodiment, in operation 505, a UE (e.g., an electronic device 101 of FIG. 2) may receive a UE capability enquiry message from a network (e.g., a network 200 of FIG. 2). The description of the UE capability enquiry message was previously provided in connection with FIG. 4. According to an embodiment, the UE 101 may receive a UE capability enquiry message from a base station (e.g., a base station 210 of FIG. 2) via a communication module (e.g., a communication module 190 of FIG. 1).

According to an embodiment, in operation 510, the UE 101 may determine UE capability information based on the number of maximum CA combinations of the network 200. According to an embodiment, the UE 101 may obtain the number of the maximum CA combinations of the network 200 from the UE capability enquiry message received from the network 200. The maximum CA combinations of the network 200 may be based on the communication specification supported by the network 200 (e.g., a particular 3GPP Release version).

According to an embodiment, the UE 101 may determine the UE capability information based on at least one of the number of CA combinations supported by the UE 101, the number of CA combinations of a region (e.g. the region to which the network 200 belongs), the number of CA combinations of a country (e.g. the country to which the network 200 belongs), the number of CA combinations of a mobile network operator (MNO), and the number of the maximum CA combinations of the network 200. According to an embodiment, the UE 101 may determine the UE capability information by comparing at least one of the at least one of the number of the CA combinations supported by the UE 101, the number of the CA combinations of the region, the number of the CA combinations of the country, and the number of the CA combinations of the MNO to the number of the maximum CA combinations of the network 200. According to an embodiment, the UE 101 may determine the UE capability information as the highest value between the number of the CA combinations supported by the UE 101, the number of the CA combinations of the region, the number of the CA combinations of the country, and the number of the CA combinations of the MNO, but still below the number of maximum CA combinations of the network 200. This way, the UE 101 may determine a CA combination that is the highest among various pieces of CA combination information but still below the number of CA combinations supported by the network 200. According to an embodiment, when all the CA combinations (e.g., the CA combinations supported by the UE 101, the CA combinations of the region, the CA combinations of the country, and the CA combinations of the MNO) are greater than or equal to the number of CA combinations supported by the network 200, the UE 101 may set CA combination information in UE capability information to be the lowest among all the CA combinations. The UE 101 may obtain information about CA combinations of the network 200, the country, the MNO, and/or a supported band of the MNO by receiving system information (e.g., a system information block) from the network 200.

According to an embodiment, the UE 101 may determine CA combinations based on the communication specification version (e.g., 3GPP Release) supported by the network 200. For example, when the communication specification version supported by the network 200 is later than the communication specification version supported by the UE 101, the UE 101 may include all CA combinations supported by the UE 101 in the UE capability information message. The UE 101 may receive system information from the base station 210 to obtain information about the communication specification version supported by the network 200.

According to an embodiment, the UE 101 may determine CA combinations based on CA combinations associated with the region (e.g., Europe, Korea, Australia, New Zealand, and the like) to which the network 200 belongs. For example, when the number of CA combinations supported by the network 200 is greater than or equal to the number of CA combinations of the region to which the network 200 belongs, the UE 101 may determine the UE capability information based on the CA combinations of the region to which the network 200 belongs. The UE 101 may include the regional CA combinations as the CA combinations supported by the UE 101 in the UE capability information.

According to an embodiment, the UE 101 may determine the CA combinations it supports based on CA combinations associated with a country to which the network 200 belongs. For example, when the number of the CA combinations supported by the network 200 is greater than or equal to the number of the CA combinations of the country to which the network 200 belongs, the UE 101 may determine the UE capability information based on the CA combinations of the country to which the network 200 belongs. The UE 101 may include the country CA combinations as the CA combinations supported by the UE 101 in the UE capability information.

According to an embodiment, the UE 101 may determine the CA combinations it supports based on CA combinations associated with an MNO of the network 200. For example, the UE 101 may determine the UE capability information based on a supported frequency band of an MNO of the network 200. The UE 101 may include the CA combinations corresponding to the frequency band supported by the MNO as the CA combinations supported by the UE 101 in the UE capability information.

According to an embodiment, in operation 515, the UE 101 may transmit the determined UE capability information message to the network 200. For example, the UE capability information message may include information about the determined CA combinations. Operation 515 may be similar to operation 410 of FIG. 4.

Figure 6:
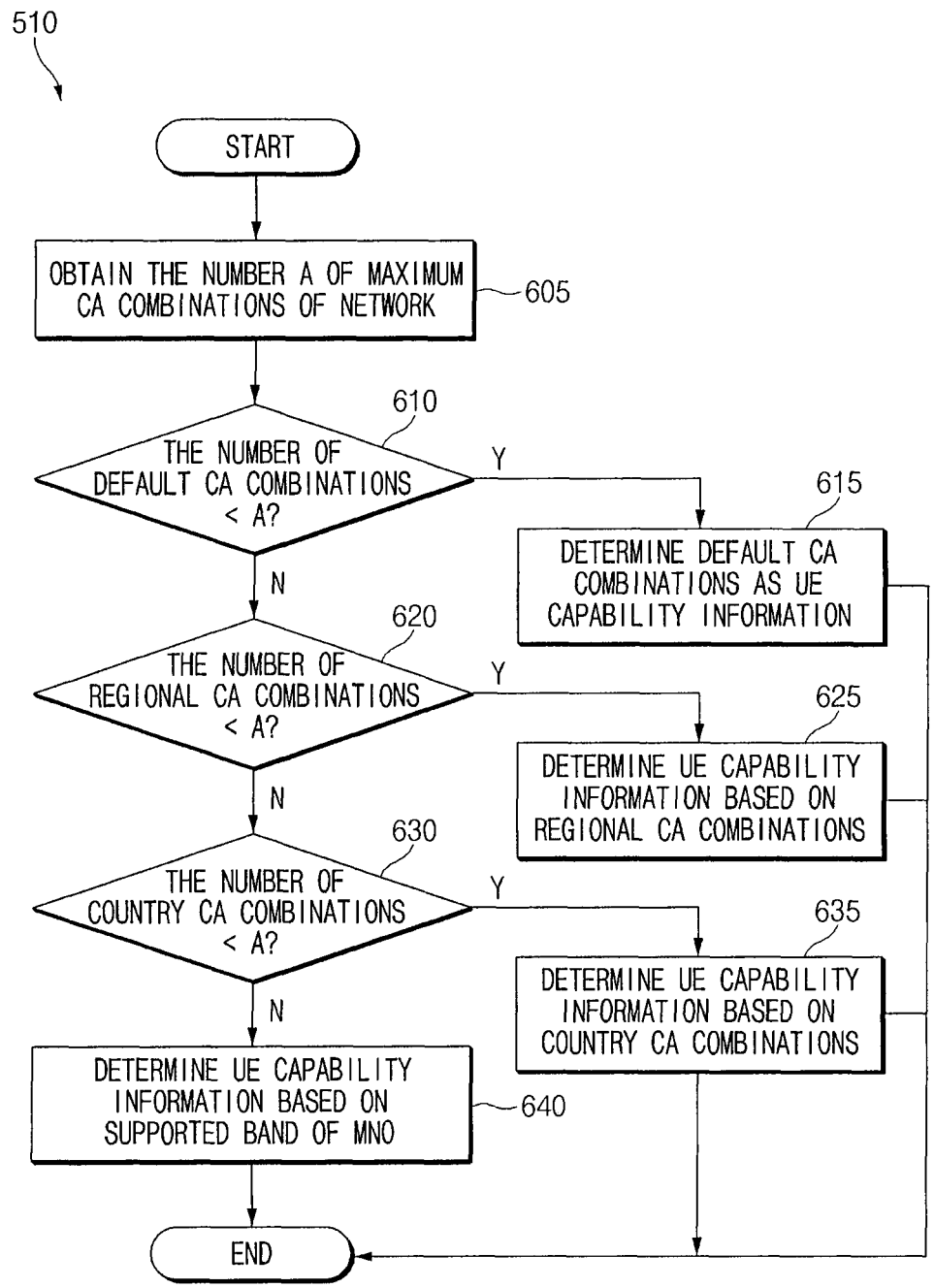
FIG. 6 is a flowchart illustrating a method for determining UE capability information in an electronic device according to an embodiment.

FIG. 6 is a flowchart illustrating a method 510 for determining UE capability information in an electronic device according to an embodiment.

According to an embodiment, operation 510, previously described in connection with FIG. 5 for determining the UE capability information of the electronic device, may include additional operations illustrated in FIG. 6, which are further described below.

According to an embodiment, in operation 605, a UE (e.g., an electronic device 101 of FIG. 2) may obtain the number of maximum CA combinations of a network (e.g., a network 200 of FIG. 2). That number may be represented as number A. For example, the number A may be the number of maximum CA combinations requested to be transmitted from the UE 101. According to an embodiment, the UE 101 may obtain the number of the maximum CA combinations of the network 200 from a UE capability enquiry message received from the network 200. For example, the number of the maximum CA combinations of the network 200 may be based on the communication specification version (e.g., 3GG Release) supported by the network 200.

According to an embodiment, in operation 610, the UE 101 may determine whether the number of default CA combinations is less than the number A, representing the maximum CA combinations of the network 200. For example, the number of the default CA combinations may be the number of maximum CA combinations supported by the UE 101. According to an embodiment, when the number of the default CA combinations is less than the number A, in operation 615, the UE 101 may determine the default CA combinations as the UE capability information. For example, the UE 101 may set the default CA combinations as CA combinations of the UE capability information. According to an embodiment, when the number of the default CA combinations is greater than or equal to the number A, the UE 101 may perform operation 620.

According to an embodiment, in operation 620, the UE 101 may determine whether the number of regional CA combinations is less than the number A representing the maximum CA combinations. For example, the region may refer to a geographical area including at least one country. According to an embodiment, the region may include Europe, Australia, New Zealand, Korea, and the other regions. The regional CA combinations may vary with each region. According to an embodiment, information about the regional CA combinations may be stored in a memory in the UE 101. According to another embodiment, the information about the regional CA combinations may be received from the network 200. According to an embodiment, the UE 101 may receive country information from the network 200 and may obtain/determine regional CA combinations corresponding to the country information. According to an embodiment, the regional CA combinations may include information about all CA combinations supported by the region corresponding to the country information received from the network 200.

According to an embodiment, when the number of the regional CA combinations is less than the number A representing the maximum CA combinations, in operation 625, the UE 101 may determine UE capability information based on the regional CA combinations. For example, the UE 101 may generate a UE capability information message including CA combination information based on regional CA combinations. In this example, the UE 101 may choose among regional CA combinations and the default CA combinations of the UE 101. According to an embodiment, when the number of the regional CA combinations is greater than or equal to the number A, the UE 101 may perform operation 630.

According to an embodiment, in operation 630, the UE 101 may determine whether the number of country CA combinations is less than the number A representing the maximum CA combinations. According to an embodiment, the country CA combinations may indicate all CA combinations supported by a corresponding country. For example, the country CA combinations may indicate all CA combinations supportable by MNOs of the network 200 in the country. According to an embodiment, information about the country CA combinations may be stored in a memory in the UE 101. According to another embodiment, the information about the country CA combinations may be received from the network 200. According to an embodiment, the UE 101 may receive country information from the network 200 and may obtain/determine country CA combinations corresponding to the country information.

According to an embodiment, when the number of the country CA combinations is less than the number A representing the maximum CA combinations, in operation 635, the UE 101 may determine UE capability information based on the country CA combinations. For example, the UE 101 may generate a UE capability information message including CA combination information based on the country CA combinations. In this example, the UE 101 may choose among country CA combinations and the default CA combinations. According to an embodiment, when the number of the country CA combinations is greater than or equal to the number A, the UE 101 may perform operation 640.

According to an embodiment, in operation 640, the UE 101 may determine UE capability information based on a supported band of an operator of the network 200. For example, the operator of the network 200 may be referred to as an MNO associated with the UE 101 and/or the network 200. According to an embodiment, the UE 101 may include, in a UE capability information message, CA combinations based on a frequency band supported by the MNO of the network 200. For example, the UE 101 may generate CA combination information based on CA combinations configured for only the supported frequency band of the MNO of the network 200.

According to an embodiment, the UE 101 may receive information about the MNO of the network 200 from the network 200. According to an embodiment, the UE 101 may also receive information about the supported frequency band of the MNO of the network 200 from the network 200. For example, the UE 101 may receive information about a supported frequency band in the system information (e.g., system information block 1 (SIB 1)) transmitted from the network 200. According to an embodiment, the UE 101 may obtain the supported frequency band of the MNO of the network 200 through frequency scanning. According to an embodiment, the UE 101 may obtain information about the supported frequency band for each MNO of the network 200 from a memory (e.g., a memory 130 of FIG. 1).

Figure 7:
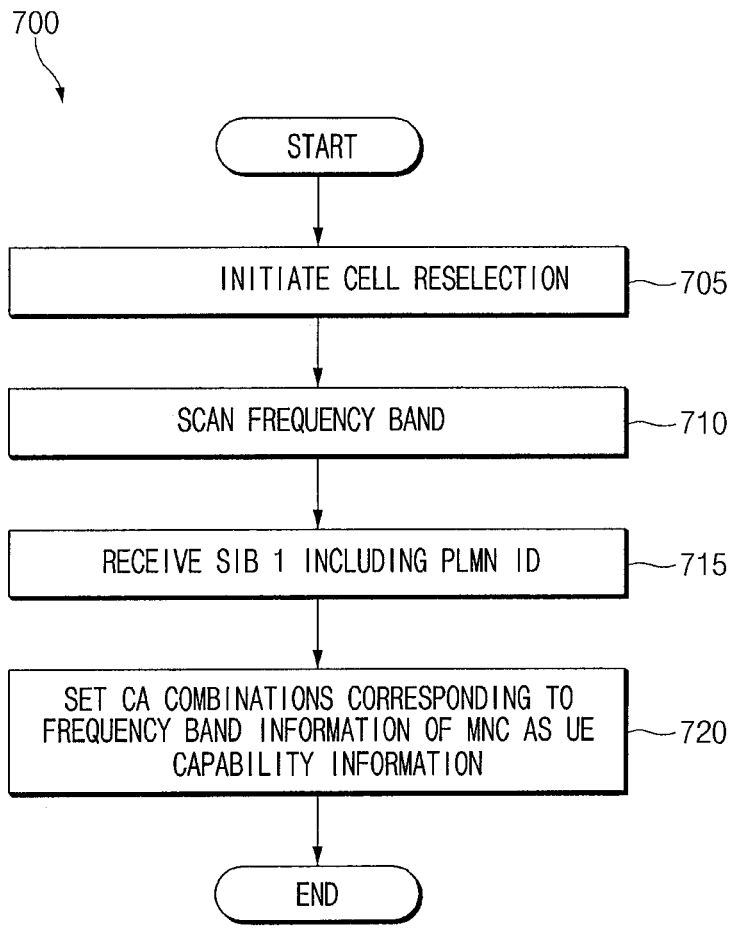
FIG. 7 is a flowchart illustrating a method for setting UE capability information when an electronic device performs cell reselection, according to an embodiment.

FIG. 7 is a flowchart illustrating a method 700 for setting UE capability information when an electronic device performs cell reselection, according to an embodiment.

According to an embodiment, in operation 705, a UE 101 (e.g., an electronic device 101 of FIG. 2) may perform cell reselection (e.g. searching for a new cell). For example, the UE 101 may perform cell reselection based on instructions from a network (e.g., a network 200 of FIG. 2) or based on communication quality (e.g., communication quality as reflected by a reference signal received power (RSRP) and/or a reference signal received quality (RSRQ)).

According to an embodiment, when a new cell is selected in operation 705, a cell ID may be changed. According to an embodiment, in operation 710, when the cell ID is changed, the UE 101 may perform frequency band scanning. For example, by radio frequency (RF) scanning of a frequency band supported by the UE 101, the UE 101 may obtain at least one frequency band having signal strength greater than or equal to a specified range. In one embodiment, the frequency band scanning may be performed as part of cell searching.

According to an embodiment, the UE 101 may receive system information (e.g., a system information block (SIB)) of the network 200 from the network 200. For example, the UE 101 may receive system information of the cell over a frequency band corresponding to the found cell. According to an embodiment, in operation 715, the UE 101 may receive SIB 1 that includes a public land mobile network-identity (PLMN-ID). The UE 101 may receive SIB 1 of the reselected cell over a broadcast control channel (BCCH). According to an embodiment, the UE 101 may receive system information from the network 200 through RRC signaling.

According to an embodiment, the PLMN-ID may be configured as a five-digit number. In this embodiment, the PLMN-ID may include a three-digit country code (e.g., a mobile country code (MCC)) and a two-digit network code (e.g., a mobile network code (MNC)).

According to an embodiment, the UE 101 may set, as UE capability information, the CA combinations corresponding to the frequency band information supported by the network operator (e.g., an MNO). According to an embodiment, in operation 720, the UE 101 may set the CA combinations corresponding to the frequency band information of an MNC corresponding to the network operator to be the UE capability information. For example, to determine the UE capability information, the UE 101 may set select among the CA combinations corresponding to the frequency band of an MNC and the default CA combinations. For example, the UE 101 may set only the CA combinations corresponding to the frequency band of the MNC as the CA combinations of UE capability information. According to an embodiment, the UE 101 may obtain network operator information (e.g., an MNC of a PLMN-ID) and frequency band information corresponding to the network operator information. The network operator information may be included in system information (e.g., SIB 1). For example, the UE 101 may obtain information of the frequency band supported by a network operator or information of the frequency band corresponding to a specific MNC using the PLMN-ID.

According to an embodiment, when a UE capability enquiry message is received from a base station (e.g., a base station 210 of FIG. 2), the UE 101 may transmit the set UE capability information to the base station 210. According to another embodiment, the UE 101 may transmit the set UE capability information to the base station 210 at a time when the set UE capability information is registered with the network 200. In this example, the UE 101 may transmit the UE capability information independently of receiving the UE capability enquiry message.

As the UE capability information is transmitted according to one or more embodiments described above with reference to FIGS. 5 to 7, the maximum CA combinations supported by a network (e.g., the network 200 of FIG. 2) may be reported to the network 200. As described above, the CA combinations supported by the UE 101 but not by the network 200 may be omitted from the reporting. Furthermore, according to the embodiments described above, as the reporting of CA combinations incapable of being supported by the network 200 is minimized, load on the network 200 may be decreased. Thus, certain embodiments in the disclosure may reduce the overhead for network traffic and CA combination management caused by the transmission CA combinations reporting.

Referring again to FIGS. 2-7, according to an embodiment, an electronic device 101 may include a communication circuitry (e.g., a communication module 190), a processor 120 configured to be operatively connected to the communication circuitry (e.g., the communication module 190), and a memory 130 configured to be operatively connected to the processor 120. The memory 130 may store instructions that, when executed, cause the processor 120 to receive a user equipment (UE) capability enquiry that includes information indicating the number of carrier aggregation (CA) combinations associated with a network 200 from the network 200 using the communication circuitry (e.g., the communication module 190), determine UE capability information based on at least one of the number of default CA combinations of the electronic device 101, the number of CA combinations of a region associated with the network 200, the number of CA combinations of a country associated with the network 200, the number of CA combinations corresponding to a supported frequency band of a mobile network operator (MNO) associated with the network 200, and the number of CA combinations associated with the network 200, and transmit the determined UE capability information to the network 200 using the communication circuitry (e.g., the communication module 190).

According to an embodiment, the instructions cause the processor 120 to, when the number of default CA combinations of the electronic device 101 is less than the number of CA combinations associated with the network 200, determine the UE capability information to include information on the default CA combinations.

According to an embodiment, the instructions cause the processor 120 to, when the number of CA combinations of the region associated with the network 200 is less than the number of CA combinations associated with the network 200, determine the UE capability information to include information on the CA combinations of the region associated with the network 200.

According to an embodiment, the instructions cause the processor 120 to, when the number of CA combinations of the country associated with the network 200 is less than the number of CA combinations associated with the network

200, determine the UE capability information to include information on the CA combinations of the country associated with the network 200.

According to an embodiment, the instructions cause the processor 120 to determine the UE capability information to include information on the CA combinations corresponding to the supported frequency band of the MNO associated with the network 200.

According to an embodiment, the instructions cause the processor 120 to select among the number of default CA combinations of the electronic device 101, the number of CA combinations of the region associated with the network 200, the number of CA combinations of the country associated with the network 200, and the number of CA combinations corresponding to the supported frequency band of the MNO associated with the network 200 having a greatest value that is less than the number of CA combinations associated with the network.

According to an embodiment, the determined UE capability information may include information about CA combinations corresponding to the selected number of CA combinations.

According to an embodiment, the instructions, when executed, cause the processor 120 to, when the number of default CA combinations of the electronic device 101, the number of CA combinations of the region associated with the network 200, and the number of CA combinations of the country associated with the network 200 are greater than the number of the CA combinations associated with the network 200, determine the UE capability information based on the CA combinations corresponding to the supported frequency band of the MNO associated with the network 200.

According to an embodiment, a method for transmitting UE capability information in an electronic device 101 may include receiving a UE capability enquiry that includes information indicating the number of CA combinations associated with a network 200 from the network 200 using a communication circuitry (e.g., the communication module 190) of the electronic device 101, determining UE capability information based on at least one of the number of default CA combinations of the electronic device 101, the number of CA combinations of a region associated with the network 200, the number of CA combinations of a country associated with the network 200, the number of CA combinations corresponding to a supported frequency band of an MNO associated with the network 200, and the number of CA combinations associated with the network 200, and transmitting the determined UE capability information to the network 200 using the communication circuitry (e.g., the communication module 190).

According to an embodiment, the determining of the UE capability information may include, when the number of default CA combinations of the electronic device 101 is less than the number of CA combinations associated with the network 200, determining the UE capability information to include information on the default CA combinations.

According to an embodiment, the determining of the UE capability information may include, when the number of CA combinations of the region associated with the network 200 is less than the number of CA combinations associated with the network 200, determining the UE capability information to include information on CA combinations of the region associated with the network 200.

According to an embodiment, the determining of the UE capability information may include, when the number of CA combinations of the country associated with the network 200 is less than the number of CA combinations associated with the network 200, determining the UE capability information to include information on CA combinations of the country associated with the network 200.

According to an embodiment, the determining of the UE capability information may include determining the UE capability information to include information on CA combinations corresponding to the supported frequency band of the MNO associated with the network.

According to an embodiment, the determining of the UE capability information may include selecting among the number of default CA combinations of the electronic device 101, the number of CA combinations of the region associated with the network 200, the number of CA combinations of the country associated with the network 200, and number of the CA combinations corresponding to the supported frequency band of the MNO associated with the network 200 having a greatest value that is less than the number of CA combinations associated with the network.

According to an embodiment, the determined UE capability information may include information about CA combinations corresponding to the selected number of CA combinations.

According to an embodiment, an electronic device 101 may include a communication circuitry (e.g., a communication module 190), a processor 120 configured to be operatively connected to the communication circuitry (e.g., the communication module 190), and a memory 130 configured to be operatively connected to the processor 120. The memory 130 may include instructions that, when executed, cause the processor 120 to perform cell reselection, scan a frequency band for the reselected cell using the communication circuitry (e.g., the communication module 190), receive system information including a public land mobile network identity (PLMN ID) from the reselected cell based on the scanning using the communication circuitry (e.g., the communication module 190), and set CA combinations corresponding to a mobile network code (MNC) included in the PLMN ID as UE capability information.

According to an embodiment, to set the CA combinations as the UE capability information, the memory 130 may further include instructions that, when executed, cause the processor 120 to select CA combinations based on a frequency band corresponding to the MNC among supported CA combinations of the electronic device 101.

According to an embodiment, the frequency band corresponding to the MNC may be included in the system information.

According to an embodiment, the system information may be included in a system information block 1.

According to an embodiment, the memory 130 may further include instructions that, when executed, cause the processor 120 to receive a UE capability enquiry message from the network 200 using the communication circuitry (e.g., the communication module 190) and transmit the set UE capability information message using the communication circuitry (e.g., the communication module 190).

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

According to certain embodiments disclosed in the disclosure, the amount of radio resources necessary for transmitting UE capability information may be minimized because the UE capability information is generated based on capabilities of the base stations or network environment of a network.

According to certain embodiments disclosed in the disclosure, the electronic device may reduce UE capability information management load of a base station by adaptively generating UE capability information.

In addition, various effects directly or indirectly ascertained through the disclosure may be provided.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   a communication circuitry;
   a processor operatively connected to the communication circuitry; and
   a memory operatively connected to the processor,
   wherein the memory stores instructions that, when executed, cause the processor to:
   receive a user equipment (UE) capability enquiry that includes information indicating a number of carrier aggregation (CA) combinations associated with a network from the network using the communication circuitry,
   determine UE capability information by:
      comparing the number of CA combinations associated with the network to a number of CA combinations of a region associated with the network,
      when the number of CA combination of the region is less than the number of CA combinations associated with the network, comparing the number of CA combinations associated with the network to a number of CA combinations of a country associated with the network, and
      when the number of CA combination of the region is less than the number of CA combinations of the country associated with the network, comparing the number of CA combinations associated with the network to a number of CA combinations corresponding to a supported frequency band of a mobile network operator (MNO) associated with the network, and transmit the determined UE capability information to the network using the communication circuitry, wherein the country and the MNO are indicated by a public land mobile network identifier of the network, and wherein the region corresponds to a geographical area including the country indicated by the public land mobile network identifier.

2. The electronic device of claim 1, wherein the memory further stores instructions that, when executed, cause the processor to:

when the number of CA combinations of the region associated with the network is compared to the number of CA combinations associated with the network and is less than the number of CA combinations associated with the network, determine the UE capability information to include information on the CA combinations of the region associated with the network.

3. The electronic device of claim 1, wherein the memory further stores instructions that, when executed, cause the processor to:

when the number of CA combinations of the country associated with the network is compared to the number of CA combinations associated with the network and is less than the number of CA combinations associated with the network, determine the UE capability information to include information on the CA combinations of the country associated with the network.

4. The electronic device of claim 1, wherein the memory further stores instructions that, when executed, cause the processor to:

determine the UE capability information to include information on the number of CA combinations corresponding to the supported frequency band of the MNO associated with the network.

5. The electronic device of claim 1, wherein the memory further stores instructions that, when executed, cause the processor to:

select among a number of default CA combinations of the electronic device, the number of CA combinations of the region associated with the network, the number of CA combinations of the country associated with the network, and the number of CA combinations corresponding to the supported frequency band of the MNO associated with the network having a greatest value that is less than the number of CA combinations associated with the network.

6. The electronic device of claim 5, wherein the determined UE capability information comprises information about CA combinations corresponding to the selected number of CA combinations.

7. The electronic device of claim 5, where the memory further stores instructions that, when executed, cause the processor to:

when the number of default CA combinations of the electronic device, the number of CA combinations of the region associated with the network, and the number of CA combinations of the country associated with the network are greater than the number of the CA combinations associated with the network, determine the UE capability information based on the CA combinations corresponding to the supported frequency band of the MNO associated with the network.

8. A method for transmitting user equipment (UE) capability information in an electronic device, the method comprising:

receiving a UE capability enquiry that includes information indicating a number of carrier aggregation (CA) combinations associated with a network from the network using a communication circuitry of the electronic device;

determining UE capability information by:
comparing the number of CA combinations associated with the network to a number of CA combinations of a region associated with the network, when the number of CA combination of the region is less than the number of CA combinations associated with the network, comparing the number of CA combinations associated with the network to a number of CA combinations of a country associated with the network, and when the number of CA combination of the region is less than the number of CA combinations of the country associated with the network, comparing the number of CA combinations associated with the network to a number of CA combinations corresponding to a supported frequency band of an mobile network operator (MNO) associated with the network; and transmitting the determined UE capability information to the network using the communication circuitry, wherein the country and the MNO are indicated by a public land mobile network identifier of the network, and wherein the region corresponds to a geographical area including the country indicated by the public land mobile network identifier.

9. The method of claim 8, wherein the determining of the UE capability information comprises:

when the number of CA combinations of the region associated with the network is compared to the number of CA combinations associated with the network and is less than the number of CA combinations associated with the network, determining the UE capability information to include information on CA combinations of the region associated with the network.

10. The method of claim 8, wherein the determining of the UE capability information comprises:

when the number of CA combinations of the country associated with the network is compared to the number of CA combinations associated with the network and is less than the number of CA combinations associated with the network, determining the UE capability information to include information on CA combinations of the country associated with the network.

11. The method of claim 8, wherein the determining of the UE capability information comprises:

determining the UE capability information to include information on the number of CA combinations corresponding to the supported frequency band of the MNO associated with the network.

12. The method of claim 8, wherein the determining of the UE capability information comprises:

selecting among a number of default CA combinations of the electronic device, the number of CA combinations of the region associated with the network, the number of CA combinations of the country associated with the network, and the number of CA combinations corresponding to the supported frequency band of the MNO associated with the network having a greatest value that is less than the number of CA combinations associated with the network.

13. The method of claim 12, wherein the determined UE capability information comprises information about CA combinations corresponding to the selected number of CA combinations.

* * * * *

UNITED STATES PATENT AND TRADEMARK OFFICE
CERTIFICATE OF CORRECTION

PATENT NO.         : 10,959,228 B2
APPLICATION NO.    : 16/296542
DATED              : March 23, 2021
INVENTOR(S)        : Kwanghee Kim et al.

Page 1 of 1

It is certified that error appears in the above-identified patent and that said Letters Patent is hereby corrected as shown below:

In the Claims

Column 20, Claim 1, Line 58 should read as follows:
--...greater than or equal to the number of CA combinations...--

Column 20, Claim 1, Lines 63-65 should read as follows:
--...of the country is greater than or equal to the number of CA combinations associated...--

Column 22, Claim 8, Lines 13-14 should read as follows:
--...region is greater than or equal to the number of...--

Column 22, Claim 8, Lines 19-21 should read as follows:
--...combination of the country is greater than or equal to the number of CA combinations associated...--

Signed and Sealed this
Twenty-fifth Day of May, 2021

Drew Hirshfeld
*Performing the Functions and Duties of the
Under Secretary of Commerce for Intellectual Property and
Director of the United States Patent and Trademark Office*